June 6, 1939.     H. J. DINSTBIR     2,160,960
TRIMMING FOR LICENSE PLATES
Filed Jan. 18, 1938
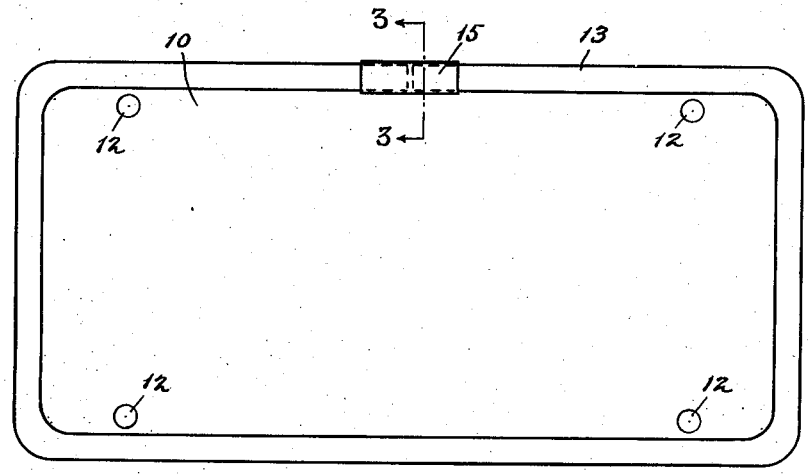
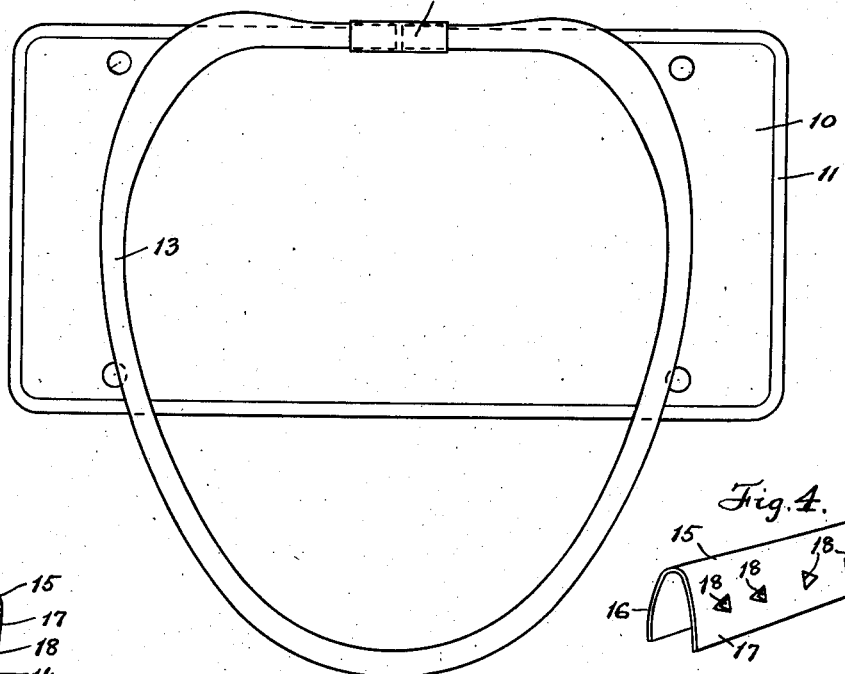
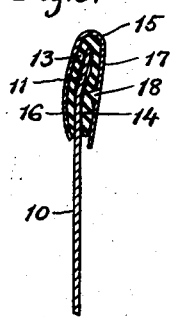
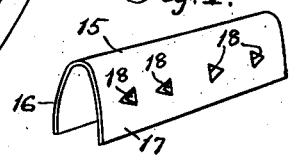
Inventor,
H. J. Dinstbir,
By Robert M. Pierson,
Attorney Patented June 6, 1939

2,160,960

UNITED STATES PATENT OFFICE 2,160,960

TRIMMING FOR LICENSE PLATES

Howard J. Dinstbir, Butler, Pa.

Application January 18, 1938, Serial No. 185,535

2 Claims. (Cl. 40—125)

This invention relates to edge trimming or framing devices for plates, especially license or registration plates for motor vehicles. It has for its object to provide an inexpensive garniture or trimming means including a flexible edging strip adapted to be made out of vulcanized soft rubber, for stretching in place around the rim of the license plate, to ornament the same, to deaden its vibration, to prevent rattling of the plate in its holder, and to act as a protector against injury to the hands when cleaning the car, etc. The invention includes a suitable clamp and a mode of applying elastic strip garniture to a license plate.

Of the accompanying drawing, Fig. 1 is a front elevation of a license plate and rubber-strip garnishing means applied thereto according to my invention.

Fig. 2 is a similar view showing the strip ends clamped together and upon one edge of the plate, preparatory to stretching the strip and fully applying it to the plate rim.

Fig. 3 is a detail enlarged cross-sectional view on the line 3—3 of Fig. 1.

Fig. 4 is a perspective view of the bendable toothed clamping fastener.

In the drawing, 10 represents a sheet-metal license or registration plate such as commonly provided for motor vehicles, adapted to be impressed with the usual designations (not shown) for identifying the vehicle, the year and the licensing authority, said plate having rounded corners, a shallow marginal bead 11 bent in the metal, and the usual holes 12 near the corners for receiving the screws of the holder bracket.

13 is vulcanized elastic rubber strip material of approximately U-shaped or channel section, formed with a rear edge bead 14 for fitting the hollow or grooved rear side of the plate bead or flange 11, said material being adapted to be inexpensively produced by extruding rubber composition through the die of a tubing machine and curing it in long lengths without a mold.

15 is a sheet-metal clamping member, which is preferably sufficiently thin to be manually bendable and adapted to be made of non-corrosive metal such as stainless steel, approximately U-shaped in section, for fastening the ends of the strip material 13 together in substantially abutting relation and upon one edge of the plate 10. Said member has a front jaw 16, forwardly bowed in section, and a substantially flat rear jaw 17 provided with integral, inwardly-projecting, triangular teeth 18 struck out of the web thereof, for partially penetrating the beaded rear wall of the rubber strip and force it into the rear groove of the plate rim bead 11 as shown in Fig. 3, to firmly unite the ends of the strip and frictionally fix them upon the plate rim.

In merchandising this attachable garniture, the sales package may include a sufficient length of the rubber strip material for the two license plates commonly required on a motor vehicle, together with a pair of the metal clamps 15. Then, when it is to be used, for each plate a piece of the strip material is cut to an abbreviated length, about 10 to 12 per cent or approximately 4 inches shorter than the aggregate length of the plate edges, its ends are brought together and fastened to each other and upon one edge of the plate approximately in abutting relation, while the intermediate portion of the strip is allowed to hang loosely in a bight or loop as shown in Fig. 2, and then the strip is stretched around the remainder of the plate perimeter, including the rounded corners, and caused transversely to embrace the plate rim at all points. The stretching around the corners causes the sides or skirts of the rubber strip to lie substantially flat against the plate, with little or no puckering or wrinkling of said skirts at the corners, and the strip is held under tension in a smooth, tight fit.

The described garniture provides an ornamental edging for a license plate, serving to deaden the vibrations thereof, to act as an anti-rattling cushion where the rubber strip comes against a holding bracket, and protects the hands of an operator against coming in contact with the sharp edges of the plate in performing cleaning or other operations upon or in the vicinity of the plate.

It will be understood that the described form of embodiment could be more or less varied without departing from the scope of my invention as defined in the claims.

I claim:

1. The combination of a substantially rectangular plate having a rearwardly grooved, beaded rim, an abbreviated length of elastic rubber strip of substantially U-shaped section, stretched around and transversely embracing the rim of said plate and bent around the corners thereof, under a greater corner tension at the bottom than at the edges of the U-section, and a substantially U-shaped, bendable metal clamp having a forwardly bowed front jaw and a substantially flat, toothed rear jaw whose teeth force the rear wall of the rubber strip into the groove of the plate rim, for holding the ends of said strip substantially together and upon the plate.

2. The method of applying a garniture to a license plate which comprises causing the ends of abbreviated rubber strip material to embrace one edge of the plate, in proximity to each other, fastening them together and upon the plate while intermediate portions of the strip hang loosely in a loop, and stretching the strip longitudinally about the perimeter of the plate, thereby flattening its sides around the plate corners.

HOWARD J. DINSTBIR.